United States Patent
Glucksman

(10) Patent No.: US 10,980,369 B2
(45) Date of Patent: Apr. 20, 2021

(54) INFUSION BEVERAGE APPARATUS

(71) Applicant: Appliance Development Corporation, Danvers, MA (US)

(72) Inventor: Dov Z. Glucksman, Winchester, MA (US)

(*) Notice: Subject to any disclaimer, the term of this patent is extended or adjusted under 35 U.S.C. 154(b) by 300 days.

(21) Appl. No.: 15/789,980

(22) Filed: Oct. 21, 2017

(65) Prior Publication Data

US 2018/0110363 A1  Apr. 26, 2018

Related U.S. Application Data

(60) Provisional application No. 62/411,593, filed on Oct. 22, 2016, provisional application No. 62/444,937, filed on Jan. 11, 2017.

(51) Int. Cl.
| | |
|---|---|
| *A47J 31/46* | (2006.01) |
| *A47J 31/44* | (2006.01) |
| *A47J 31/00* | (2006.01) |
| *A47J 31/053* | (2006.01) |

(52) U.S. Cl.
CPC .......... *A47J 31/462* (2013.01); *A47J 31/002* (2013.01); *A47J 31/053* (2013.01); *A47J 31/4403* (2013.01)

(58) Field of Classification Search
CPC ........ A47J 31/002; A47J 31/04; A47J 31/053; A47J 31/10; A47J 31/4403; A47J 31/461; A47J 31/462
See application file for complete search history.

(56) References Cited

U.S. PATENT DOCUMENTS

| | | | | |
|---|---|---|---|---|
| 2,190,270 A | * | 2/1940 | Peters | A47J 31/54 99/303 |
| 4,206,694 A | * | 6/1980 | Moskowitz | A47J 31/0647 99/295 |
| 5,868,062 A | * | 2/1999 | Enomoto | A47J 31/002 99/282 |
| 2005/0145112 A1 | * | 7/2005 | Scribner | A47J 31/057 99/279 |
| 2007/0095213 A1 | * | 5/2007 | Blanc | A47J 31/002 99/279 |
| 2008/0314255 A1 | * | 12/2008 | Lee | A47J 31/057 99/280 |
| 2016/0007797 A1 | * | 1/2016 | Lin | A47J 31/36 99/295 |
| 2018/0220832 A1 | * | 8/2018 | Psarologos | A47J 31/521 |

FOREIGN PATENT DOCUMENTS

WO   WO-2015051407 A1 * 4/2015 ............. A47J 31/44

* cited by examiner

*Primary Examiner* — Erin E McGrath
(74) *Attorney, Agent, or Firm* — Frank Marino

(57) ABSTRACT

A cool coffee infusing apparatus is disclosed having a liquid container, a ground coffee container, and a base. The base includes a pump, controls therefore, and receptacles for the containers. The liquid container is filled with cool water and the ground coffee container is filled with ground coffee. The pump circulates the water through the grounds until a desired level of infusion is achieved and coffee beverage is created. The coffee beverage is collected in the liquids container for pouring or for storage for later use.

28 Claims, 12 Drawing Sheets

INFUSION BEVERAGE APPARATUS

RELATED APPLICATION

This application claims priority to U.S. Provisional Applications Nos. 62/411,593 filed on 22 Oct. 2016 and 62/444,937 filed on 11 Jan. 2017, the teachings of which are incorporated herein in their entirety by reference.

FIELD OF THE INVENTION

This invention relates to an apparatuses and methods for producing infused beverages.

BACKGROUND

Apparatuses for making infused beverages, such as coffee, are well known in the art. Coffee is often made by percolating heated water over and through coffee grinds, and catching the filtered hot coffee beverage below, or by drip-infusing using water heated in a vessel or a through-flow heater, and then poured over ground coffee, and catching the filtered hot coffee beverage below. In such traditional methods, the heated water passing though the ground coffee particles enters the porous structure of the ground beans and extracts the organic acids and oils which produce the distinct coffee flavor and aroma. The infused liquid coffee is in some cases dispensed into a cup, or in other cases into a carafe from where it is eventually poured into drinking cups.

Although coffee is traditionally infused with hot or near-boiling water, it is also possible to infuse coffee with unheated water. A preference for cool infused coffee has recently arisen, principally due to its unique and distinct flavor. As many of the bitter organic acids contained in coffee are extractable from the ground coffee only at higher temperatures, coffee infused with hot or boiling water is characterized by a harsh acrid taste. Cool infused coffee avoids this problem. As the preference for cool infused coffee has grown, several developments in the cool infusing process have been made.

Cool infused coffee is traditionally made by steeping coffee grounds in cold water for 12-24 hours and then draining the extract from the coffee grounds through a filter. The current state of the art is to mix the cool water and coffee together in a container, allow the mixture to steep, then pour the contents through a cheese cloth or other filter type to separate the liquid coffee from the grounds. Another technique involves placing cool water and ground coffee inside a paper bag and then tying it with a string and putting this bag inside a mesh bag to lessen the chance of the paper bag breaking, then placing the entire assembly in a glass container. When it is time to filter the coffee beverage form the grounds, the user lifts the assembly from the container and suspends it above another container so that most of the coffee beverage drips out, then squeezes the mesh bag to force the remaining beverage out. The main problem with this system is that is messy and burdensome, but it is also inefficient. It is not unusual to find coffee grounds in the bag after removal that have never been wetted.

There is a need to provide a less messy and less complicated manner for producing cool-infused beverages such as cool infused coffee, and such is a result of this invention. There is a need to provide a less burdensome manner for producing such beverages, and such is a result of this invention. There is a need to provide a faster process for producing such beverages, and such is a result of this invention. There is a need to provide an automated process for producing such beverages, and such is a result of this invention. There is a need for an appliance which executes such an automated process, and such is a result of this invention. Further needs and results will become apparent as one reviews the disclosure contained herein.

The foregoing examples of the related art and limitations related therewith are intended to be illustrative and not exclusive. The limitations of the related art will become apparent to those skilled in the art upon a reading of the specification and a study of the drawings.

SUMMARY OF THE INVENTION

One aspect of the present invention is to provide an easy-to-use cool infusion system. Another aspect of the present invention is to shorten the infusion time by forcibly moving the water around the ground coffee particles to maximize the extraction of organic acids and oils from the ground coffee. A further aspect of the present invention is to ensure that at the end of the infusion cycle there is a physical separation between the liquid coffee and the ground coffee, thereby terminating the infusion process. Yet another aspect of the present invention is to end the infusion process with all the liquid coffee confined to a vessel that is easily removable from the appliance to be stored in a refrigerator, for later consumption, or to pour into a glass for immediate consumption.

To achieve the above stated results, the apparatuses disclosed herein include a base, a liquid container, and a ground coffee container. The base includes an electric pump and electric controls therefore. The base has fluid connectors interconnected by tubing to afford liquid flow there-between, and may be adapted to receive the containers at the fluid connectors in liquid communication. The flow through the connectors is achieved by the pump. Valves may be provided at the interfaces of the containers and the base, to prevent leakage when the containers are removed and allow flow when the containers are received. The coffee grounds container may have a first fine mesh filter proximate its bottom, and a second removable fine mesh filter proximate its top. A sealable top lid may allow addition and removal of the coffee grounds between the filters, and cleaning of the interior of the container and the filters. The grounds container may be adapted to communicate with the pump to receive water from and provide infused liquid to the liquid container.

The invention may be embodied in or practiced using an infused beverage apparatus with a first container having a liquid reservoir for initially retaining water and subsequently retaining and dispensing an infused beverage, a first container first opening for liquid passage proximate its bottom, a second container having an infusing reservoir for retaining an infusible material, a second container first opening for liquid passage proximate its bottom, and a base adapted to engage the first and second containers. The base may have a pump, a first fluid pathway for providing liquid communication between the first container's opening for liquid passage, the pump, and the second container's opening for liquid passage, and a second fluid pathway for providing liquid communication between the second container, and the first container. And the base may have a control.

With the base engaging the first and second containers, the liquid reservoir retaining the water, and the infusing reservoir retaining the infusible material, the control may be adapted to cause the pump to convey the water from the liquid reservoir through the first fluid pathway and into the infusing reservoir to flow though the infusible material wherein the water becomes the infused liquid, and through the second fluid pathway and into the liquid reservoir.

The base may be adapted to engage the first and second containers, at least in part, through normally-closed valves disposed in the containers and valve actuators disposed in the base. The valve actuators may be adapted to open the valves to enable fluid communication between the containers and the base, and the valves may be adapted to seal the containers when the containers are disengaged from the base to prevent container leakage.

The control may include a timer, and may be adapted to continue causing the pump to convey the infused liquid from the liquid reservoir through the first fluid pathway and into the infusing reservoir to flow though the infusible material and through the second fluid pathway and into the liquid reservoir continuously for a predetermined period of time. The predetermined period of time may be user selectable.

The first container may have a first container second opening for liquid passage proximate its bottom, a normally closed first container first valve at the first container first opening, and a normally closed first container second valve at the first container second opening. The second container may further have a second container second opening for liquid passage proximate its bottom, a normally closed second container first valve at the second container first opening, and a normally closed second container second valve at the second container second opening. And the base may further have valve actuators adapted to open the first and second container first and second valves when the first and second containers are engaged by the base. The first fluid pathway may provide liquid communication between the first container first valve, the pump, and the second container second valve. The second fluid pathway may provide liquid communication between the second container first valve, and the first container second valve.

With the base engaging the first and second containers so that the valve actuators open the first and second container first and second valves, the liquid reservoir retaining the water, and the infusing reservoir retaining the infusible material, the control may be adapted to cause the pump to convey the water from the liquid reservoir through the first container first valve, the first fluid pathway, and the second container second valve and into the infusing reservoir to flow though the infusible material wherein the water becomes the infused liquid, and through second container first valve, the second fluid pathway and the first container second valve and into the liquid reservoir.

The control may be adapted to pause the pump after a user selectable predetermined period of time while the water is becoming the infused beverage.

Alternatively, the first container may have a normally closed first container valve at the first container's first opening, and the first container's second opening may be a top opening. The second container may have a normally closed second container valve at the second container's first opening, and the second container's second opening may be a drain. The base may include valve actuators adapted to open the first and second container valves when the first and second containers are engaged by the base, and the first fluid pathway may provide liquid communication between the opened first container valve, the pump, and the second container valve. The second fluid pathway may provide liquid communication between the drain and the top opening. And the base may be adapted to engage the first and second container valves with the infusing reservoir disposed above the liquid reservoir and the drain disposed directly over the top opening. With the base engaging the first and second containers so the valve actuators open the first and second container valves, the liquid reservoir retaining the water, and the infusing reservoir retaining the infusible material, the control may adapted to cause the pump to convey the water from the liquid reservoir through the first container valve, the first fluid pathway, and the second container valve and into the infusing reservoir to flow through the infusible material wherein the water becomes the infused liquid, and then from the drain and through the top opening and into the liquid reservoir. The control may include a timer, and may be adapted to continue causing the pump to convey the infused liquid from the liquid reservoir through the first container valve, the fluid pathway, and the second container valve and into the infusing reservoir to flow through the infusible material and then from the drain and through the top opening and into the liquid reservoir continuously for a user selectable predetermined period of time.

Alternatively, the invention may be embodied in or practiced using an infused beverage apparatus having a first container with a liquid reservoir for initially retaining water and subsequently retaining and dispensing an infused beverage and a first container opening for liquid passage proximate its bottom, a second container having an infusing reservoir for retaining an infusible material and a second container opening for liquid passage proximate its bottom, a base adapted to engage the first and second containers and having a pump, a first fluid pathway for providing liquid communication between the first container opening, the pump, and the second container opening, a second fluid pathway for providing liquid communication between the second container and the first container, and a control.

With the base engaging the first and second containers, the liquid reservoir retaining the water, and the infusing reservoir retaining the infusible material, the control may be adapted to cause the pump to convey the water from the liquid reservoir through the first fluid pathway and into the infusing reservoir to combine with the infusible material wherein the water becomes the infused liquid, and then from the second container opening through the second fluid pathway and the first container opening and into the liquid reservoir.

The base may be adapted to engage the first and second containers, at least in part, through normally-closed valves disposed in the containers and valve actuators disposed in the base. The valve actuators may be adapted to open the valves to enable fluid communication between the containers and the base, and the valves may be adapted to seal the containers when the containers are disengaged from the base to prevent container leakage.

The control may include a timer, and may adapted to continue causing the pump to convey the infused liquid from the liquid reservoir through the first fluid pathway and into the infusing reservoir to flow though the infusible material and through the second fluid pathway and into the liquid reservoir continuously for a user selectable predetermined period of time. The control may be adapted to pause the pump after a user selectable predetermined period of time while the water is becoming the infused beverage.

The pump may be a peristaltic pump.

DETAILED DESCRIPTION OF EXEMPLARY EMBODIMENTS

Figure 1:
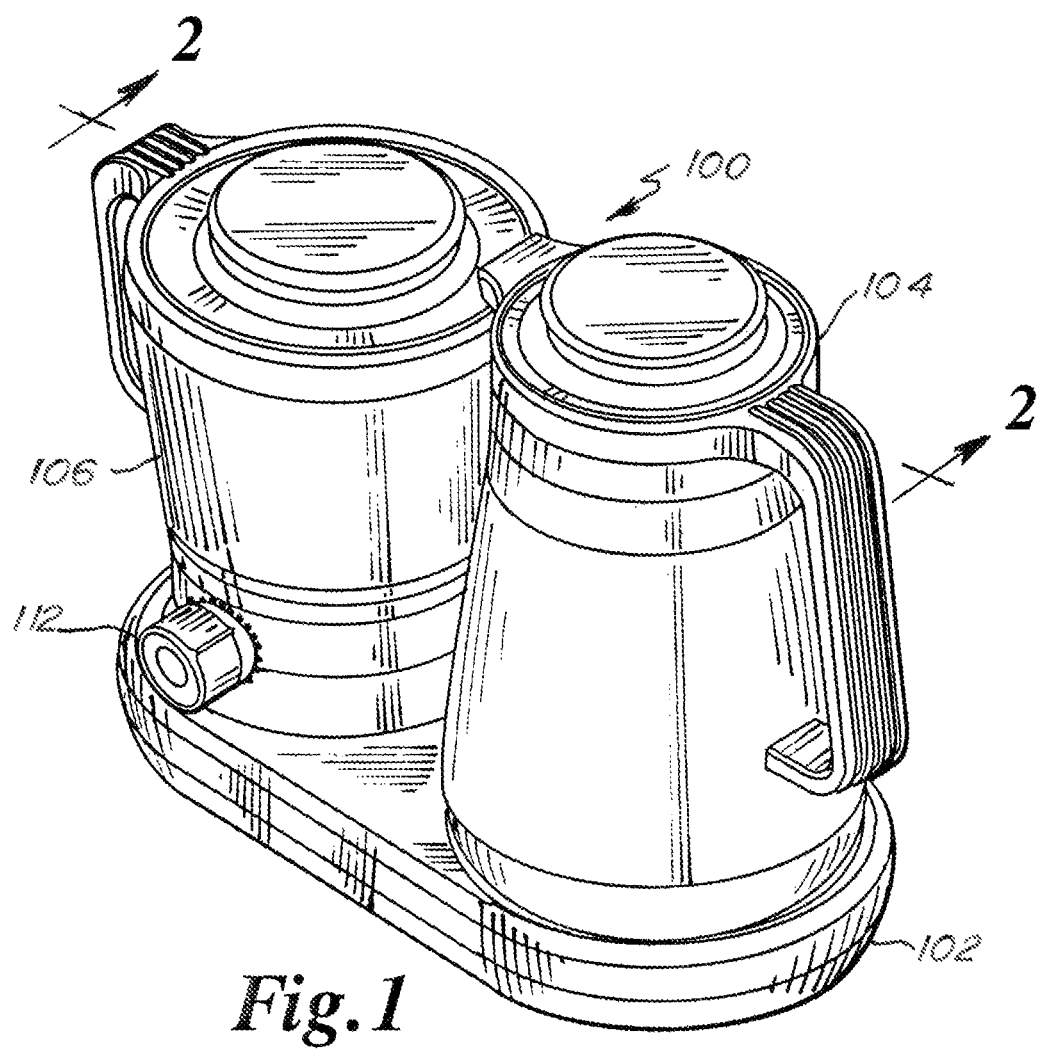
FIG. 1 is a perspective view of a first exemplary embodiment of an apparatus according to or for use in practicing the invention.

FIGS. 1 through 4E show a first apparatus 100 having a base 102, a liquid container 104, and a ground coffee container 106. The base includes an electric pump 108 and an electric control 112 therefore. The base has two pairs of valve-actuating fluid connectors 114A/114B/114C/114D and the pump has one pair of fluid connectors 114E/114F. Pressure-relief valve 110 has one pair of connectors 114G/114H. This spring-loaded pressure-relief valve is only a safety feature that allows flow from connector 114H to connector 114G when the pressure at connector 114H relative to that at connector 114G exceeds a predetermined unsafe level.

The connectors are interconnected by tubing to afford liquid flow there-between. Tube 116A provides sealed liquid communication between connector 114E of the base and connector 114E of the pump. Tube 116B provides sealed liquid communication between connector 114F of the pump, connector 114G or the pressure valve, and connector 114C of the base. Tube 116C provides sealed liquid communication between connector 114D of the base, connector 114H of the pressure valve, and connector 114B of the base. Of course, any effective form of conduit or fluid pathway may be substituted for the tubing provided it allows sealed fluid flow between the appropriate connectors. The flow through these interconnected connectors is caused by the pump.

The liquid container (carafe) includes a handle 118 and a pouring spout 122 with two liquid connectors 124A/124B including valves 126A/126B projecting downwardly within a D-shaped depression 166A in its bottom. Connector 124A communicates with the interior reservoir 130 of the carafe and connector 124B communicates with riser tube 128 disposed centrally within and integral with the carafe, with its perforated upper cap 132 located proximate the top of the reservoir. So effectively, connector 124B communicates with the perforations in the upper cap.

Valve-actuating fluid connectors 114A/114B/114C/114D each include a valve assembly (not shown), with a piston having a stem that projects upwardly into the mating valve of the mating container. The piston is spring-biased upwards and includes a rubber seal that normally seals the base connector to avoid spillage when the base is carried alone such as to the sink for rinsing. The stem projects into and opens the normally closed mating container valve and the container valve pushes down on the stem to unseal and open the mating connector. The liquid connectors 124A/124B/124C/124E are thus able to engage in a liquid tight manner with valve-actuating fluid connectors 114A/114B/114C/114D, respectively.

Connectors 114A/114B are disposed within D-shaped protrusion 164A of the base and connectors 114C/114D are disposed within D-shaped protrusion 164B of the base, which is in turn disposed atop support tower 158 of the base. The D-shaped protrusion 164A is adjacent tower 158 and thereby adjacent D-shaped protrusion 164B. The D-shaped protrusions provide adjacent receptacles for the containers.

Valves 126A/126B are normally closed and designed to seal as soon as the carafe is removed from the base and connectors 124A/124B disengage from connectors 114A/114B, respectively, to ensure that the liquid container is liquid tight and avoid any liquid dripping when it is removed. D-shaped recess 166A mates with the D-shaped protrusion 164A when the carafe is being engaged with the base, to ensure alignment of the mating connectors and to provide stability to the assembly.

The coffee grounds container (infusible materials container) includes an infusible materials reservoir 143, a first fine mesh filter 144 at the bottom of the reservoir, a second fine mesh filter 146 at the top of the reservoir, a sealable lid 148 atop the container, and two connectors 152A/152B. The reservoir is thereby defined by the space between the two fine mesh filters, and infusible material will be contained only therein. Connector 152A communicates with connector 114C of the base and below the first fine mesh filter, and below the reservoir. Connector 152B communicates with connector 114D and thereby with second riser tube 154 disposed centrally within the container with its perforated top end 155 located above the second fine mesh filter. So effectively, connector 152B communicates with the perforations in the top end, in the space 153 above the reservoir. These connectors are also designed to engage in a liquid tight manner with a second set of two receptacles 156A/156B positioned on the bottom of the unit.

Valves 126C/126D are normally closed and designed to seal as soon as the infusible materials container is removed from the base and connectors 124C/124D disengage from connectors 114C/114D, respectively, to ensure that the infusible materials container is liquid tight and avoid any liquid dripping when it is removed. D-shaped recess 166B mates with the D-shaped protrusion 164B when the container is being engaged with the base, to ensure alignment of the mating connectors and to provide stability to the assembly.

Figure 2:
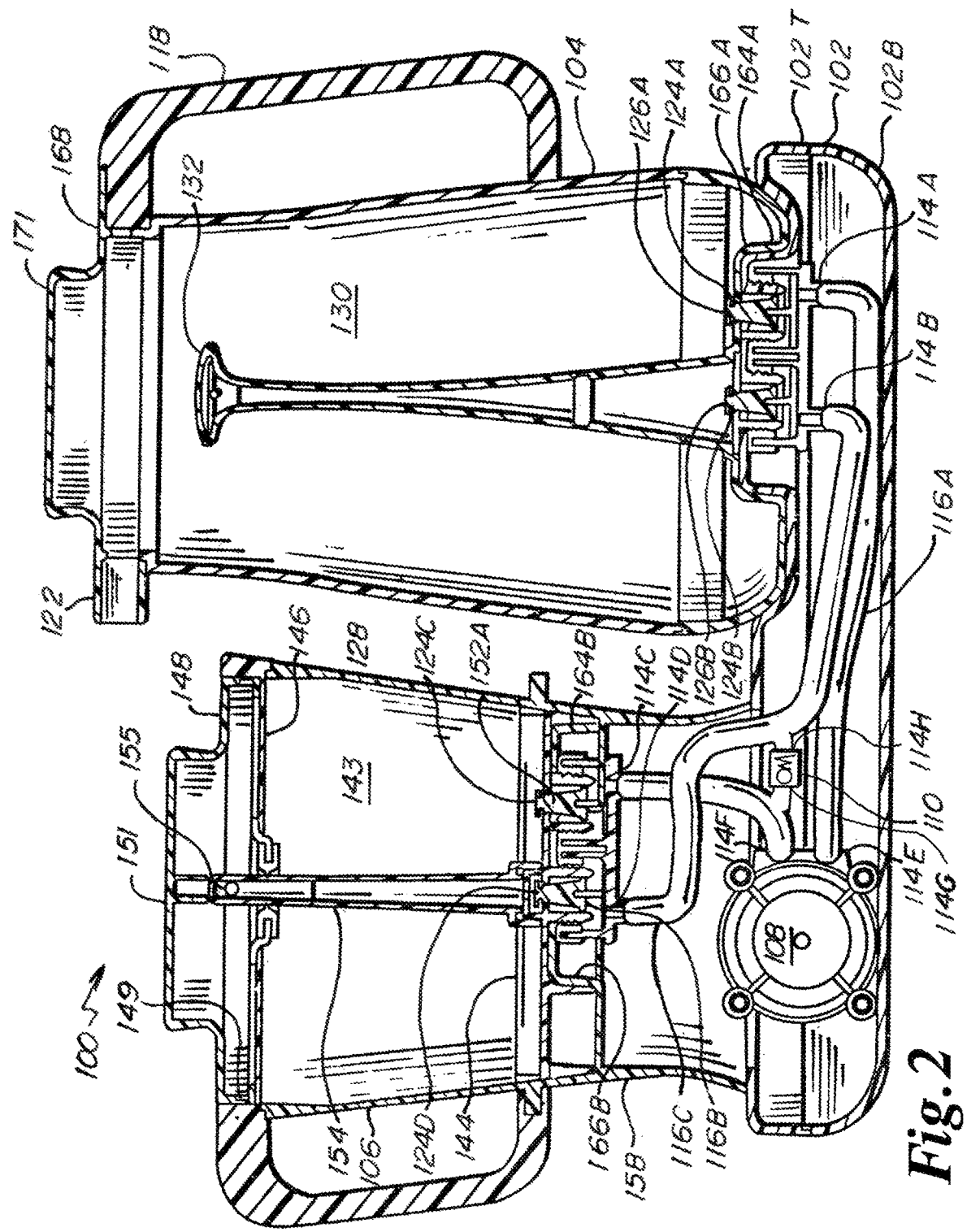
FIG. 2 is a cross sectional view along lines 2-2 in FIG. 1.
Figure 3:
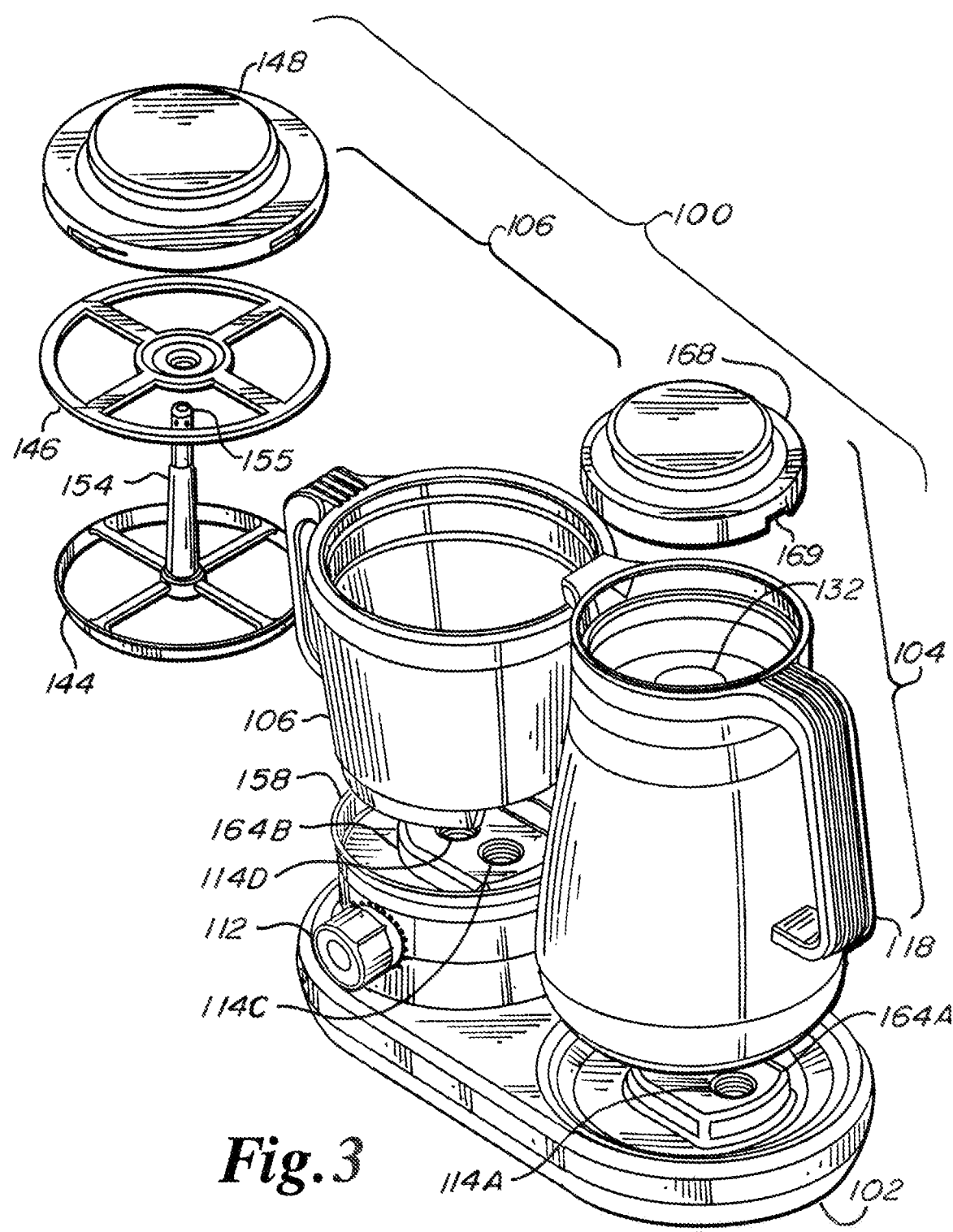
FIG. 3 is a perspective view of the embodiment of FIG. 1 with its components separated for ease of viewing.

FIG. 2 is a cross sectional view of apparatus 100 showing additional design details of the base, the carafe and the grounds container. The base consists a top portion 102T and a bottom portion 102B which together form a housing to contain the tubing, pump, and internal wiring and controls (not shown). The top portion includes the support tower 158 and the two D-shaped receptacles.

The base also contains the control 112, which is disposed on tower 158, the pump (preferably a peristaltic pump) and the afore-described series of tubes connecting between the four base connectors, the pressure-relief valve connectors, and the pump connectors in a manner that creates a closed loop through which liquid can flow continuously when the pump is activated, as shall be described below. The lower portion 102B of the base may be secured to the upper portion 102T by screws, gluing, sonic welding, or other means known in the art, to form the complete base 102.

The carafe and infusible materials container are preferably predominantly made of a combination of polymeric components (excepting for instance such components as stainless-steel valve springs and rubber seals. Where components are permanently affixed together and intended to retain liquid, such is done so by sealing means, such as solvent gluing, sonic welding, or such. The reservoir portions of the carafe and container are preferable a transparent material, so that the user can view the interiors thereof during operation.

The carafe includes top lid 168, which is removable for filling carafe with water and cleaning. The lid includes a slot 169, which may be allowed to align with spout 122 when the lid is rotated, to allow dispensing through the spout with the lid in place. Otherwise, the lid may be rotated to close off the spout, to avoid spillage such as when the filled carafe is stored in a refrigerator, and for coffee to pick up "fridge odors". The lid features a hand grip portion 171 to assist in tilting, and lifting/returning the lid from/onto the carafe.

The grounds container sealing lid 148 includes the male threading and a circular rubber seal 149. The male threads of the sealing lid screw into female threads atop the container such that the seal becomes compressed, thereby sealing the grounds container against leakage from any expected pressure within. Alternatively, the lid could be hinged to the container and latchable to sealingly engage the lid and seal to the container, or any other common means could be employed to removably seal the lid to the container. The lid also features a hand grip 151 for assisting the user in attaching and detaching.

The second fine mesh filter is removable from the second riser tube. The filters seal around their outer peripheries to the interior of the container and the second fine mesh filter seals around its center opening to the second riser tube by a circular rubber bushing, which is integral with the filter. These measures prevent escape of the fine coffee grains from reservoir 143, as they might be trapped in the gap of any of the seals and prevent them from properly sealing resulting in undesirable leaks. The fine mesh filters and the second riser tube are removable together or individually from within the infusible materials container when sealing lid 148 is removed. The upper second fine mesh filter 146 may be removed alone by grasping it and pulling upwardly to release it from the container and from the second riser tube, such as for filling the reservoir with fresh coffee grounds or for discarding spent grounds. Or the combined filters and the tube may be removed together by grasping the top end of the second riser tube and pulling, such as for cleaning.

The interior of the grounds container is divided into three compartments communicating with each other only through the fine mess filters; the lower compartment is confined between the bottom of the grounds container and the lower first filter, below the reservoir 143, and communicates with valve 152A; the grounds compartment, or reservoir, where coffee grounds are housed during the infusing process, is between the filters, and the upper compartment, space 153, is confined between the lid and the upper second filter, above the reservoir and communicating with valve 152B through the riser tube.

The fine mesh filters are made of a fine mesh annular discs capture-molded into a rigid frame having inner and outer rings connect by spokes. The mesh may be constructed of fine metal wires or plastic fibers and may alternatively be sealed to the frame by sonic welding, solvent bonding, or some equivalent manner. The hollow riser tube may alternatively be independent of the inner ring of the lower filter, sealed to it by circular rubber bushing, which is integral with the filter. Its open bottom fits snuggly into the bottom of the container so that when seated, the riser tube is sealably connected to the container. The top of the riser tube reaches above the upper filter, and is provided with top openings that communicate with the upper compartment.

When the control activates the pump, water is conveyed from the liquid container through tube 116A, the pump, through tube 116B and into the bottom of the infusible materials container. The water rises through the first lower filter where it fills reservoir 143, and floats the dry coffee grounds with it. eventually, the coffee grounds are blocked from further rising by the second filter and form a dense bed of grounds that the water permeates through and infuses the oils from the grounds and becomes cool-infused infused liquid. The infused liquid continues to rise through upper filter and flows over the open top end 155 of and into riser tube 154, then down through the tube and into tube 116C and into the liquids container. This flow can either be paused by the control to allow the coffee grounds to infuse for a preselected period of time, so that the coffee is circulated back through the grounds continuously to ensure that the coffee beverage reaches the desired strength or can be stopped by the user at any time. The control thereby allows the user to select the strength of the coffee beverage. Once the cool-infusing has terminated, the pump is reversed by the controller (or by the user, if there is alternatively a pump reversing switch provided) and the infused liquid within the infusible materials container is drawn out through tube 116C, the pump, and tube 116A and conveyed into the liquids container.

Also shown in FIG. 2 is the pressure relief valve 110 connecting tubes 116B and 116C. If a blockage or some other unforeseen condition arises and pressure within the grounds container inadvertently rises towards an unsafe level, the valve allows discharge from tube 116B to tube 116C so that the pressure may be vented through the unsealed liquid container.

Figure 4A:
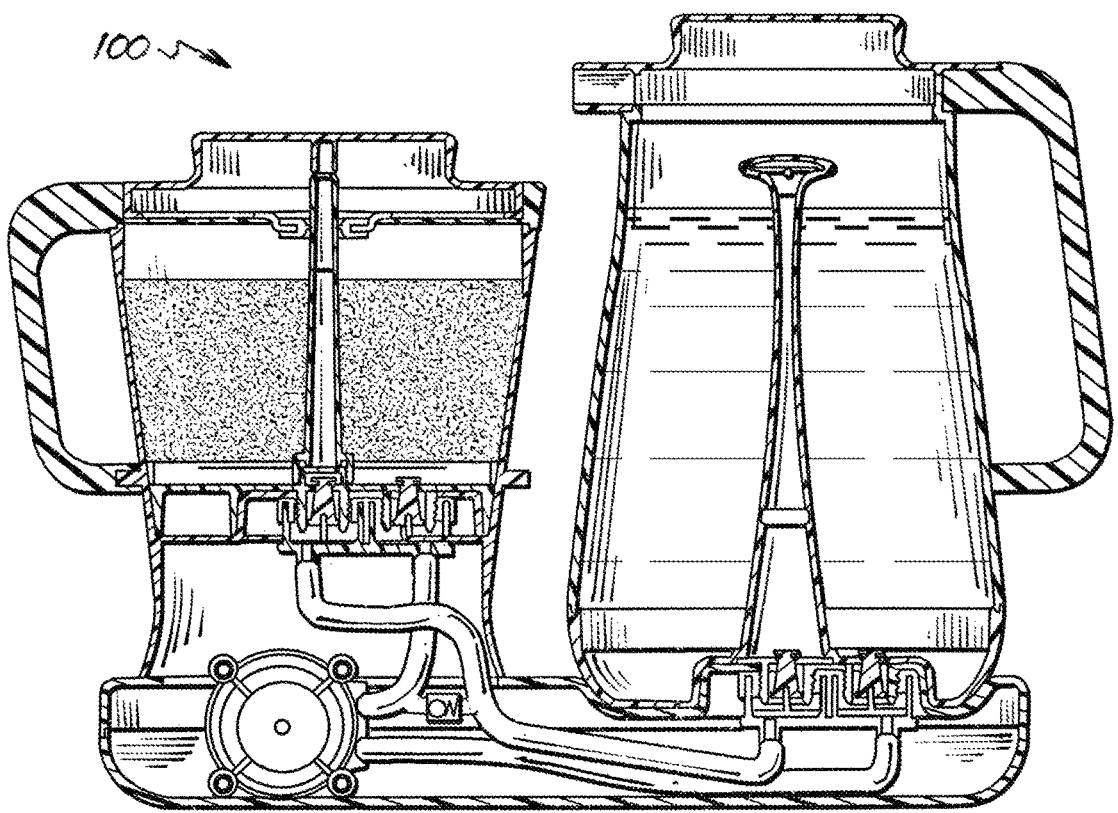
FIG. 4A is a schematic view of the embodiment of FIG. 1 before the start of the process with cool water in the carafe and ground coffee particles in the ground coffee container.
Figure 4B:
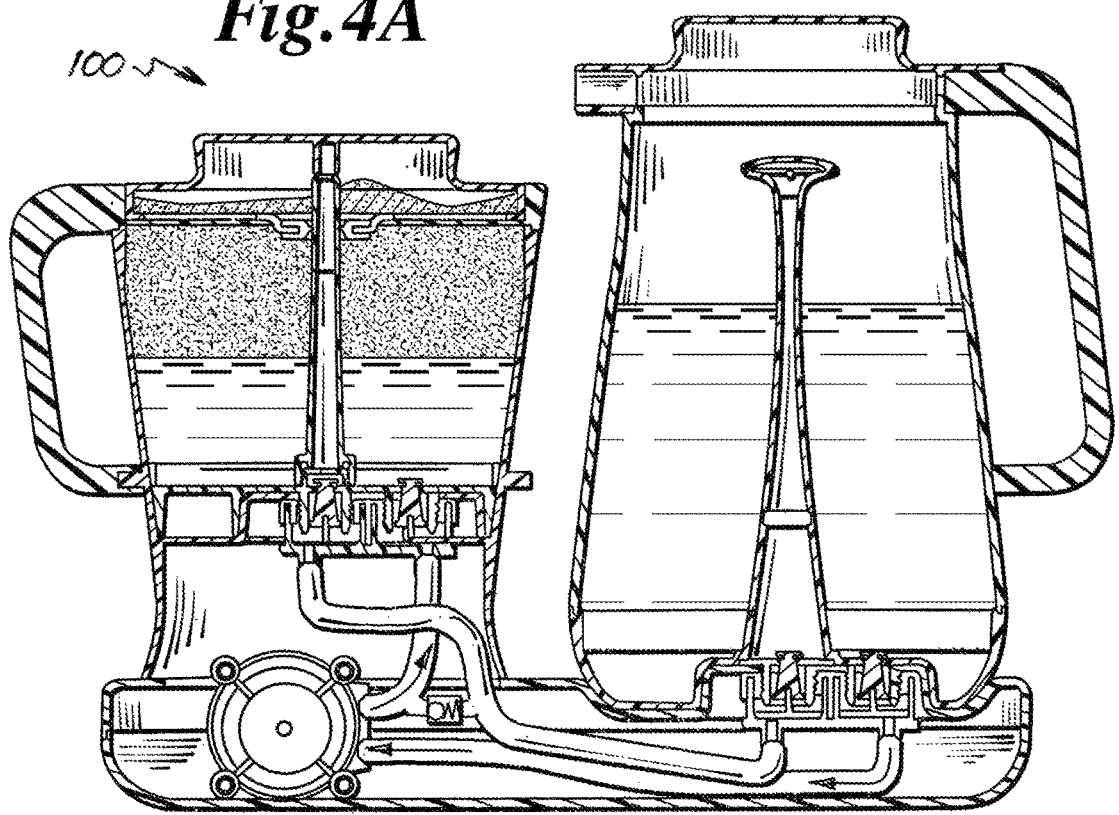
FIG. 4B is a schematic view of the embodiment of FIG. 1 with cool water starting to flow from the carafe and into the ground coffee container, with ground coffee floating to the top of the water level.
Figure 4C:
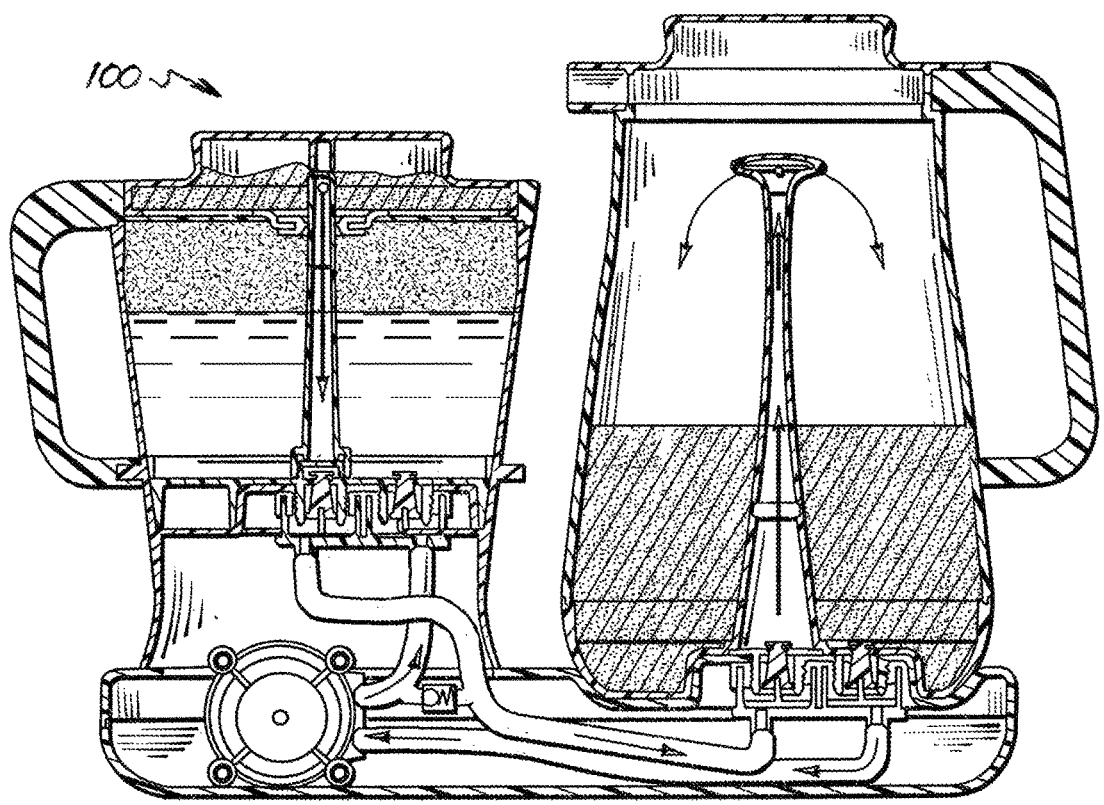
FIG. 4C is a schematic view of the embodiment of FIG. 1 with liquid coffee flowing through the entire system during the infusion process.
Figure 4D:
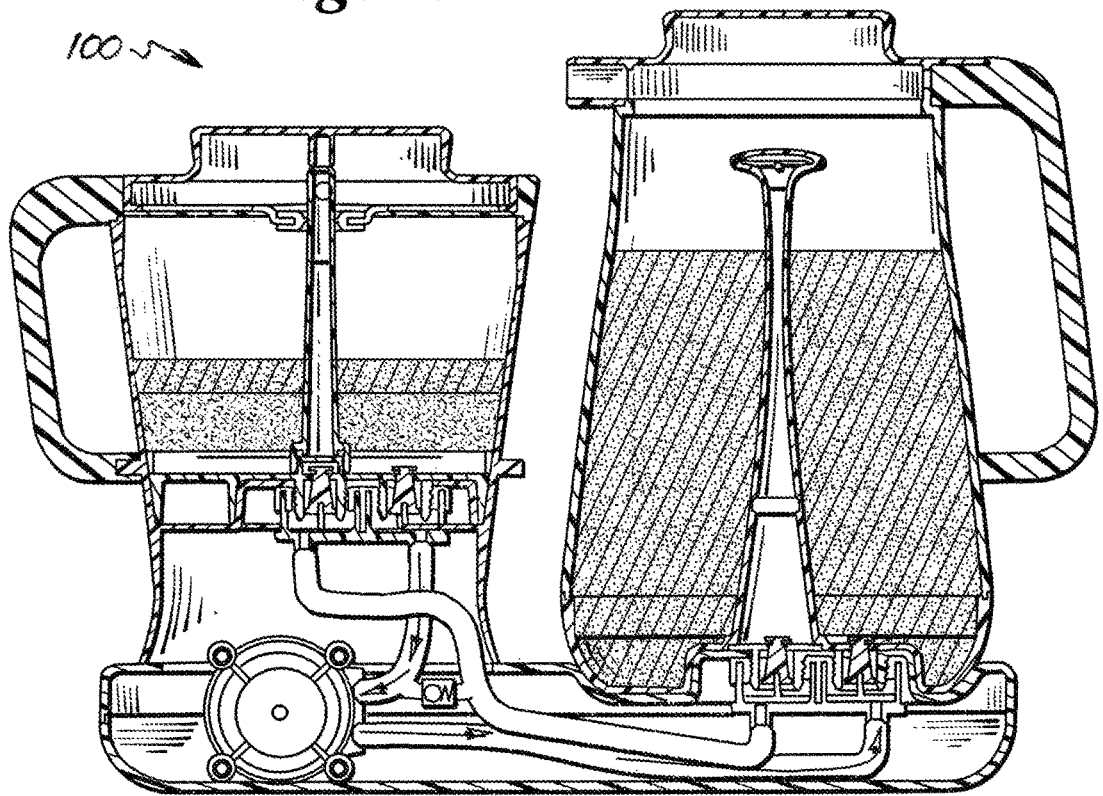
FIG. 4D is a schematic view of the embodiment of FIG. 1 as liquid coffee is extracted from the coffee grounds after the conclusion of the infusion process, and returned into the carafe.
Figure 4E:
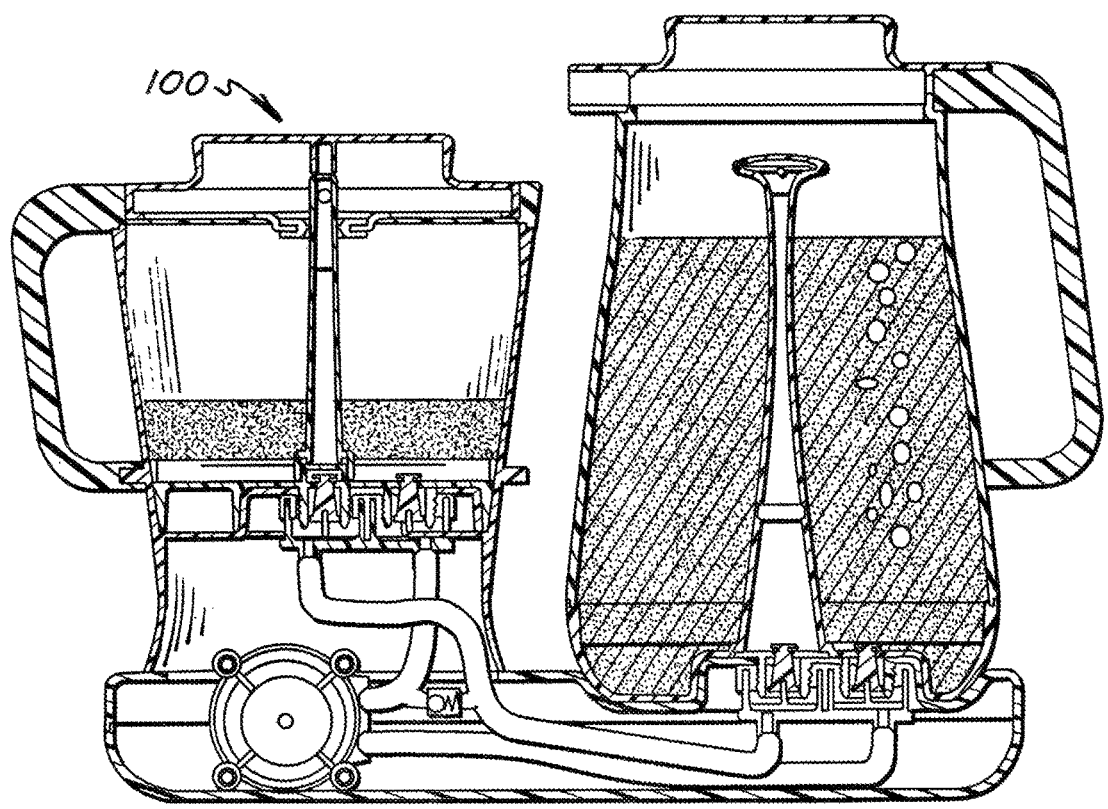
FIG. 4E is a schematic view of the embodiment of FIG. 1 at the end of the process with all the liquid coffee confined in the carafe and air being drawn through the coffee grounds to help dry them for easy removal.

FIGS. 4A, 4B, 4C, 4D, and 4E illustrate the infusing process that takes place in apparatus 100. In FIG. 4A the apparatus is shown in cross section as seen before the start of the infusing process with cool water in the carafe's reservoir and dry coffee grounds in the infusible container's reservoir. In FIG. 4B the apparatus is shown in cross section, shortly after the pump was started and cool water is starting to flow from the carafe into the grounds container lifting and compressing the dry grounds, which have a lower volumetric density than water. In FIG. 4C the apparatus is shown in cross section during the infusing part of the cycle, with liquid coffee flowing through the entire system. In FIG. 4D the apparatus is shown in cross section after completion of the infusion cycle, and as liquid coffee is being extracted from the coffee grounds and is returned into the carafe through tubes 116B and 116A. And in FIG. 4E the apparatus is shown in cross section at the end of the process with all the liquid coffee confined to the carafe and air being drawn through the coffee grounds to help dry them for easy removal (air bubbles are shown rising through the liquid coffee).

FIGS. 5 to 7E illustrate the major components of a second apparatus 200 in accordance with or useful in practicing the invention. For brevity, item number will follow that used for items equivalent to those of the first embodiment, for instance the base of first embodiment was item number 102, so the base for the second embodiment will be assigned item number 202, etc. Also for brevity and to avoid redundancy, features and functions which are the same as those of the first embodiment will not be described in as much detail and the reader should refer to the description of the first embodiment therefore.

Figure 5:
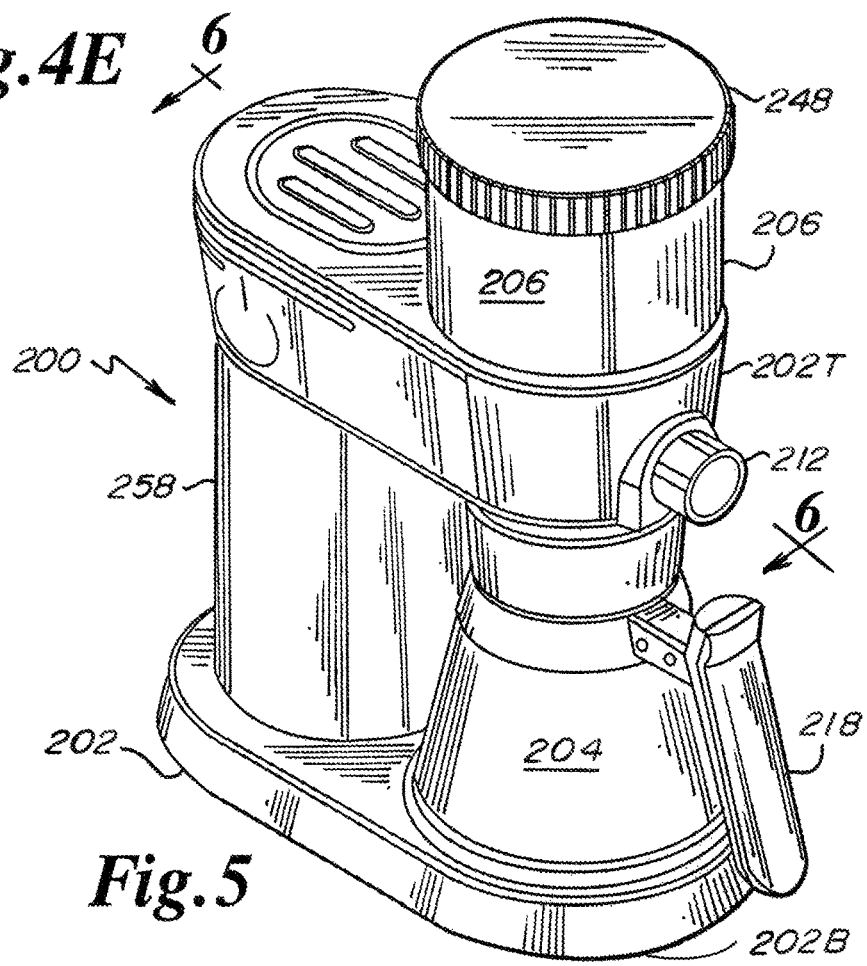
FIG. 5 is a perspective view of a second exemplary embodiment of an apparatus according to or for use in practicing the invention.

FIG. 5 illustrates the major components of apparatus 200, which includes base 202, a liquid container 204 (carafe), and ground coffee container 206 (infusible materials container). Control 212 selectively energizes pump 208 to operate the apparatus, as shall be described in detail below. The base further supports the carafe. Both the grounds container and the carafe may be removed and returned to the base by the user, as shall be described in detail below.

The base has a flat lower portion 202B for supporting the liquid container with an adjacent upwardly extending support tower 258. Extending horizontally from the top of the tower is a cantilevered extension 202T for supporting the grounds container directly over the liquid container. Alternatively, the grounds container could be integrally formed with the cantilevered extension 202T. Control 212 is disposed on the extension for ready access, but as in the first embodiment, may be disposed elsewhere if desired.

The base is adapted similarly in most undescribed ways to interface with the containers as in the first embodiment, excepting that instead of using the components of return flow path 116C of the first embodiment, this embodiment has an unsealed gravity-induced return flow path as will be described. This eliminates one of the valves of each container, two of the sealed connectors of the base, and the communicating tubing. Because the liquids container 204 (carafe) is disposed below the infusible materials container 206 (grounds container), infused liquid from the grounds container is allowed to simply pour directly, or through an intermediary conduit downwardly into the opened top 280 of liquid container 204 during operation.

Figure 6:
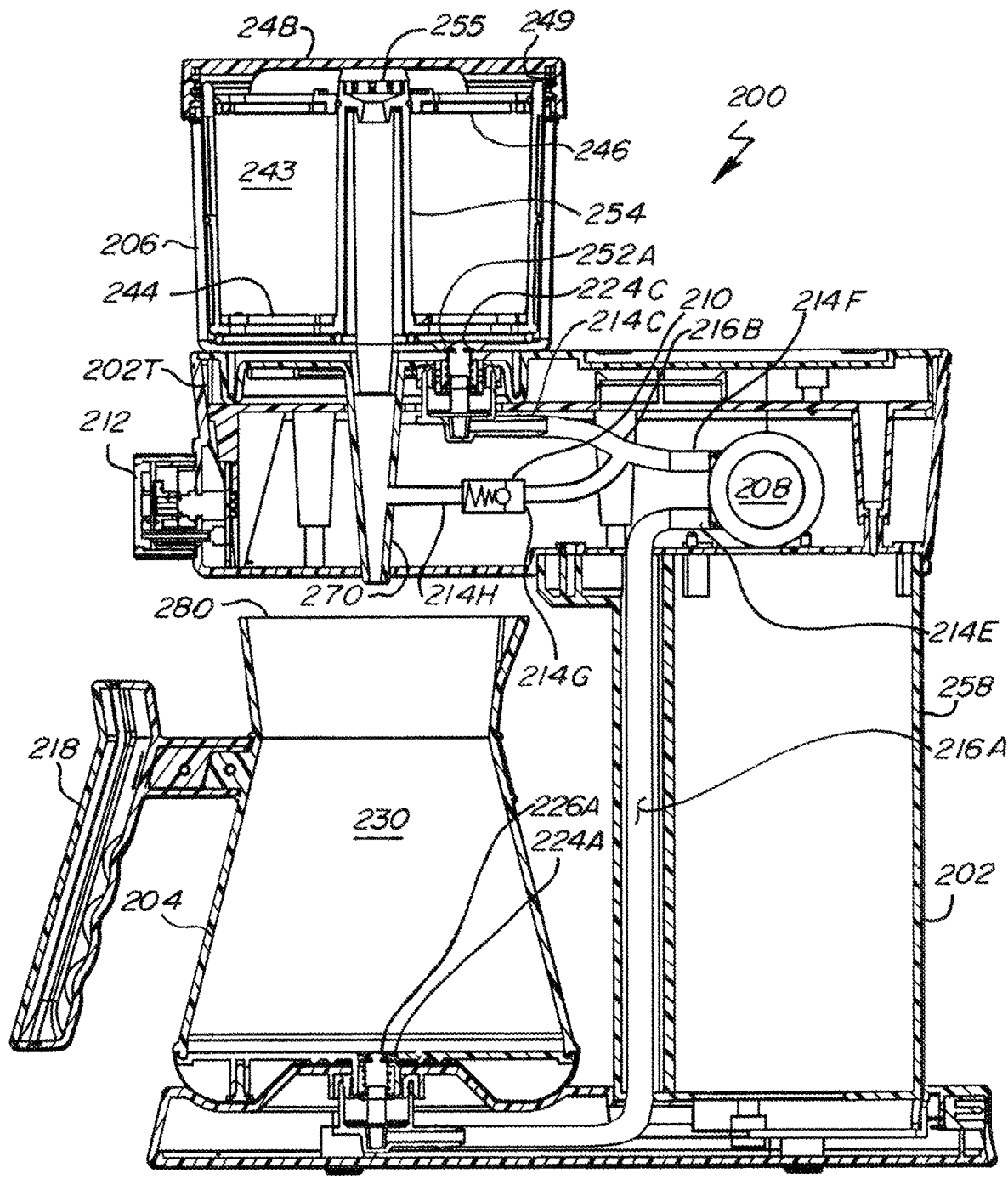
FIG. 6 is a cross sectional view of the embodiment of FIG. 5 along lines 6-6 in FIG. 5.

As seen in FIG. 6, tube 216A conveys water from liquid container 204, through pump 208, and then into the bottom of the infusible materials container 206 through tube 216B.

The cantilevered extension features a funnel 270 for receiving liquid coffee from the top of the grounds container. The funnel may be centrally positioned over the liquids container. Water entering at the bottom of the grounds container rises through the first lower filter where it fills reservoir 243, and floats the dry coffee grounds with it. Eventually, the coffee grounds are blocked from further rising by the second filter and form a dense bed of grounds that the water permeates through and infuses the oils from the grounds and becomes cool-infused infused liquid. The infused liquid continues to rise through second fine mesh filter 246, leaving the wet grounds within the infusing reservoir 243, and flows over the open top end 255 of the vertical center tube 254, then flows down through funnel 270 and into reservoir 230 of the liquids container 204. This flow can continue for a predetermined time period, according to the setting of the control, so that the coffee circulated back up and through the grounds continuously to ensure that the infused liquid reaches the desired strength or that the coffee grounds are fully depleted. The control thereby allows the user to select the strength of the coffee beverage, at the end of the process. Once the cool-infusing has terminated, the pump is reversed and the infused infused liquid within the infusible materials container is drawn out through tube 216C, the pump, and tube 216A and forced into the liquids container.

Figure 7A:
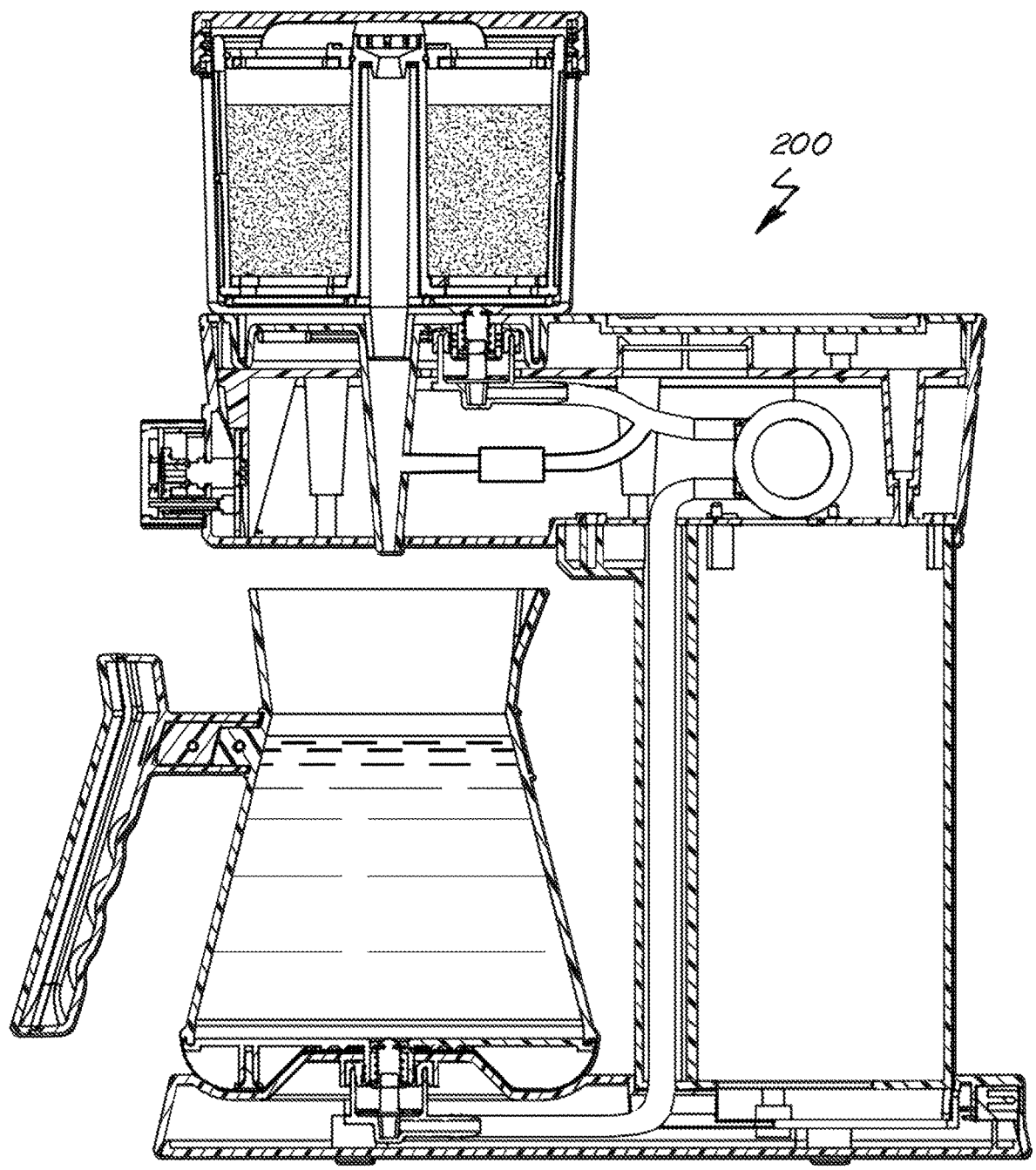
FIG. 7A is a schematic view of the embodiment of FIG. 5 before the start of the process with cool water in the carafe and ground coffee particles in the ground coffee container.
Figure 7B:
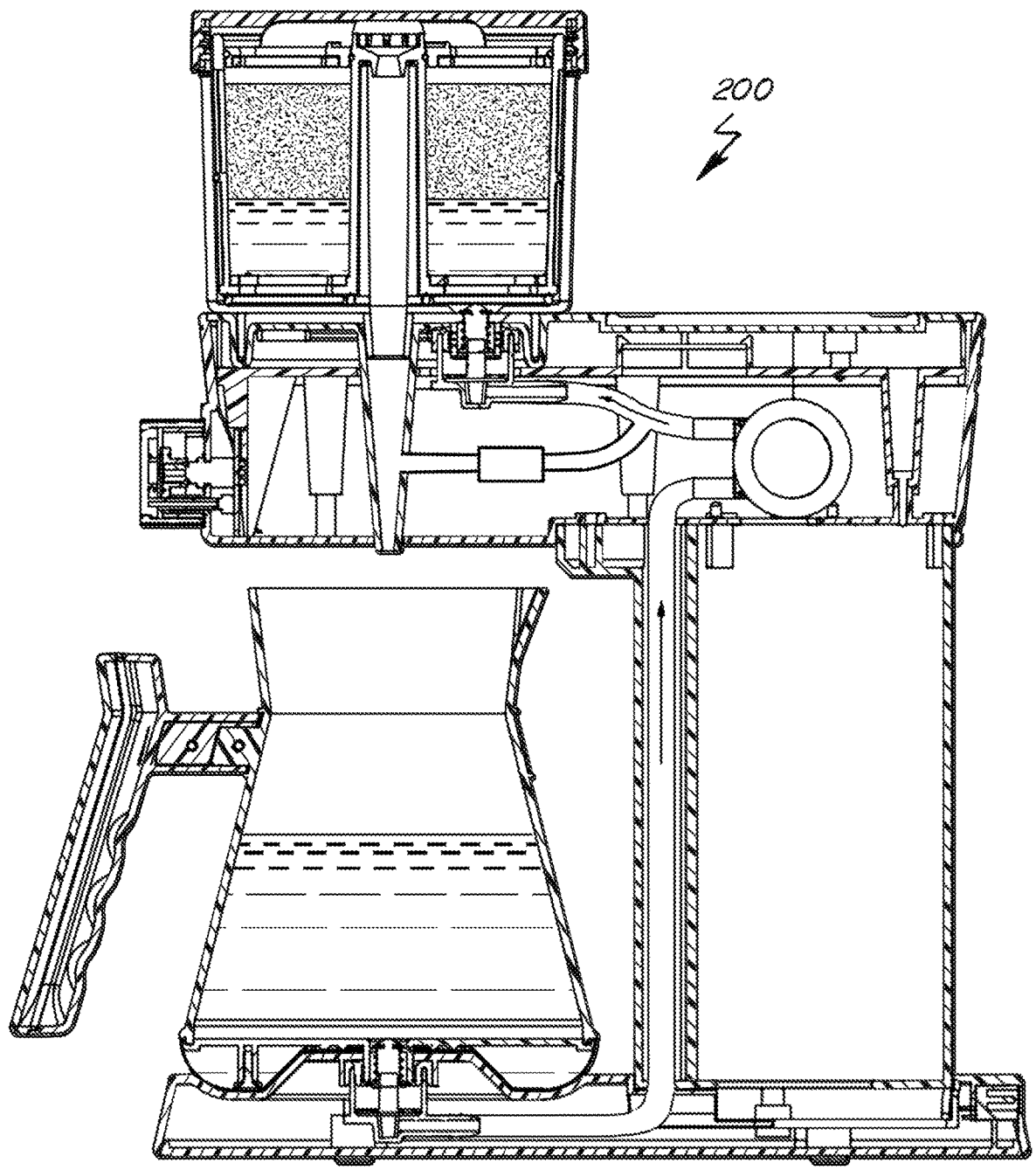
FIG. 7B is a schematic view of the embodiment of FIG. 5 with cool water starting to flow from the carafe and into the ground coffee container, with ground coffee floating to the top of the water level.
Figure 7C:
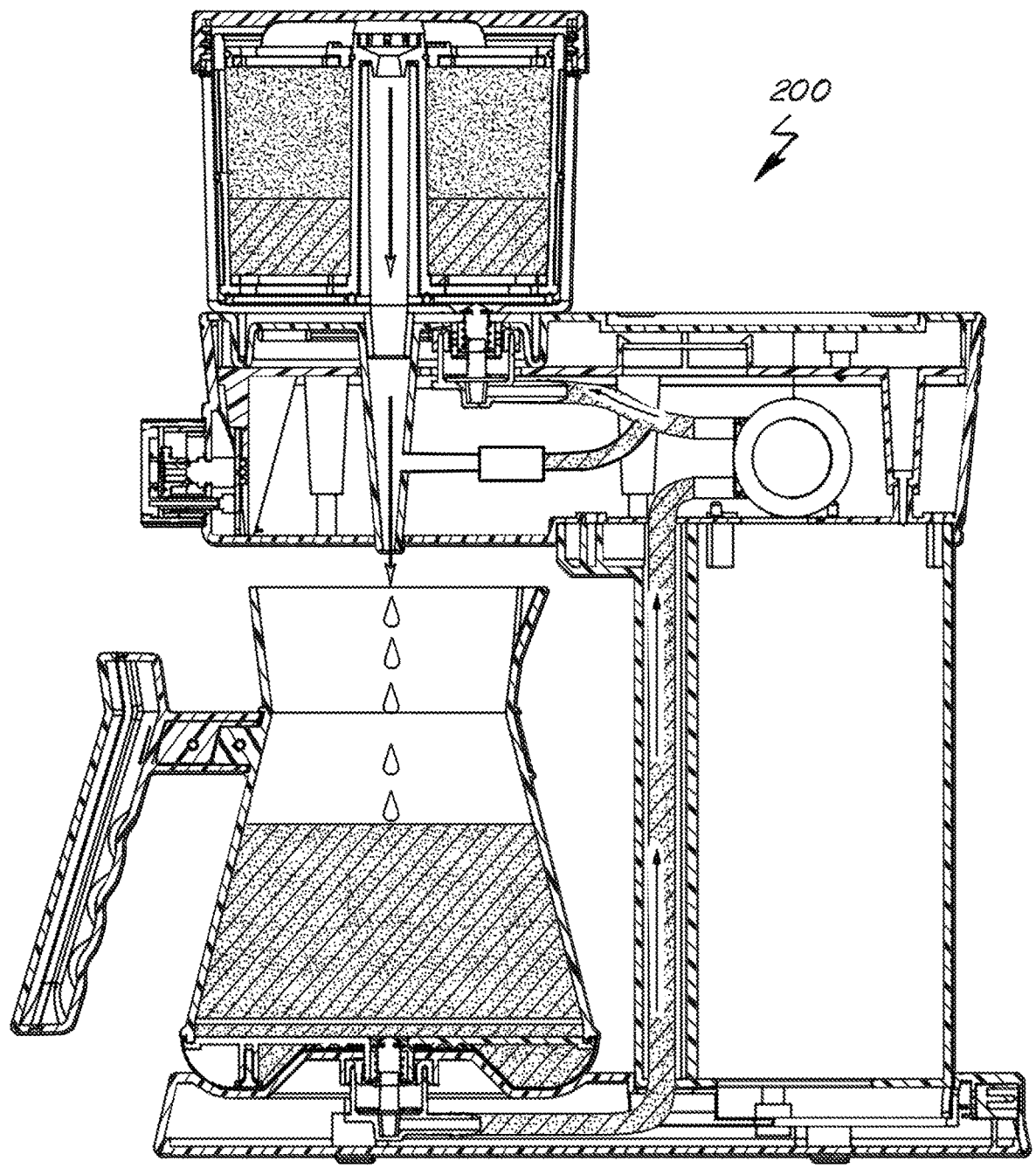
FIG. 7C is a schematic view of the embodiment of FIG. 5 with liquid coffee flowing through the entire system during the infusion process.
Figure 7D:
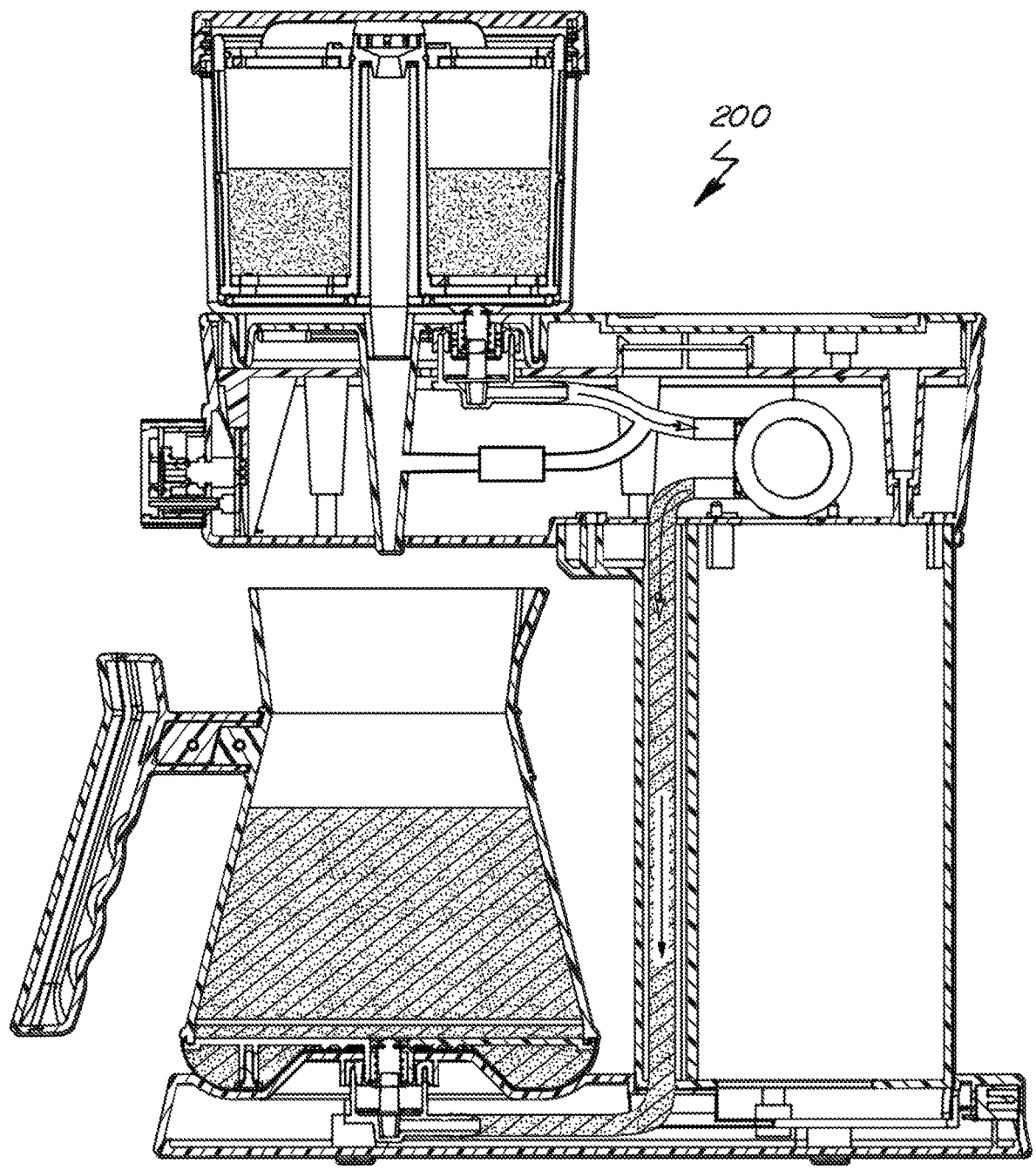
FIG. 7D is a schematic view of the embodiment of FIG. 5 as liquid coffee is extracted from the coffee grounds after the conclusion of the infusion process, and returned into the carafe.
Figure 7E:
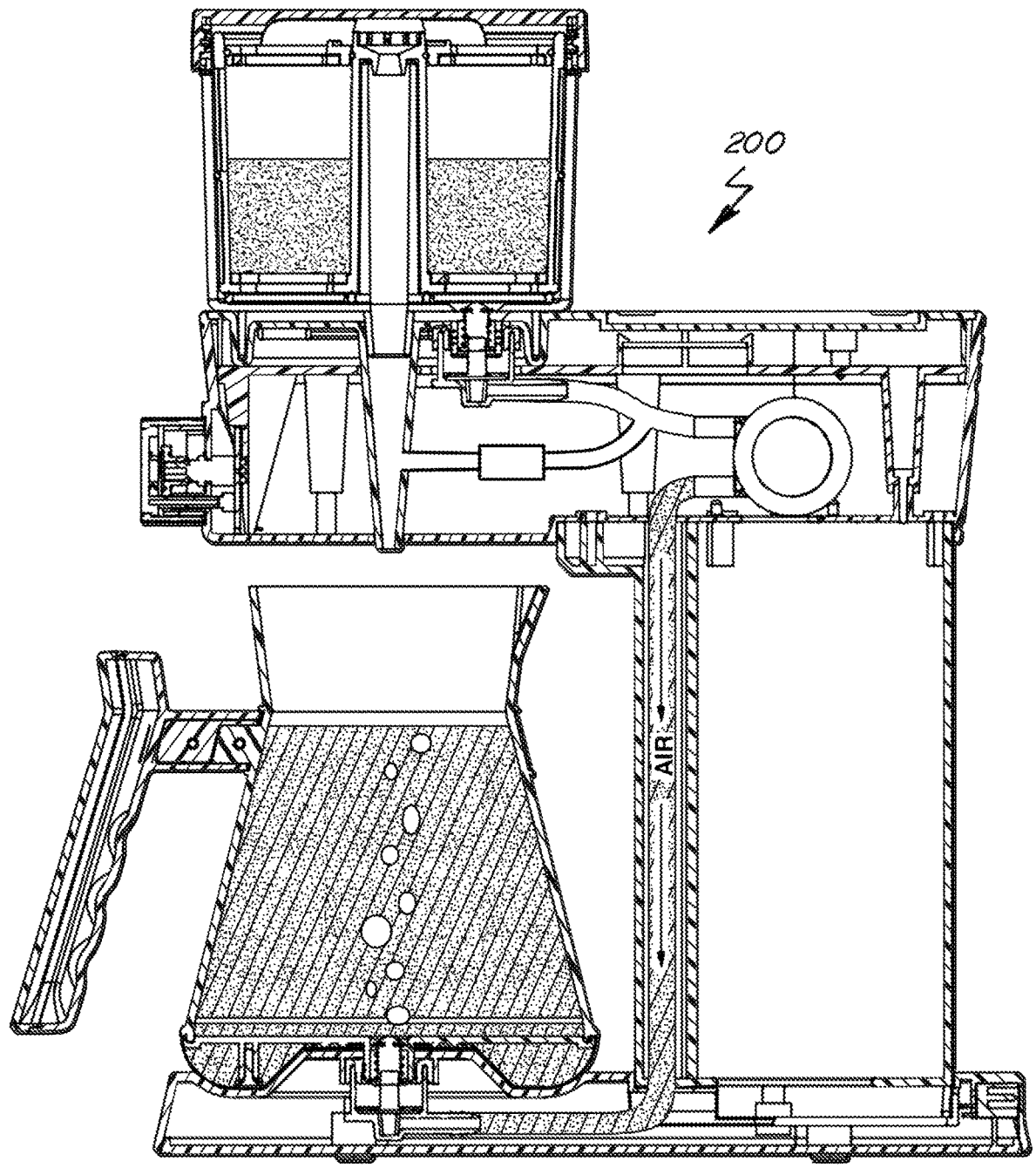
FIG. 7E is a schematic view of the embodiment of FIG. 5 at the end of the process with all the liquid coffee confined in the carafe and air being drawn through the coffee grounds to help dry them for easy removal.

FIGS. 7A through 7E are schematic illustrations of the infusing process of apparatus 200 In FIG. 7A the apparatus is shown in cross section as seen before the start of the infusing process with cool water in the carafe and ground coffee particles in the ground coffee container. In FIG. 7B the apparatus is shown in cross section, shortly after the pump was started and cool water started to flow from the carafe into the ground coffee container, lifting and compressing the dry grounds, which have a lower volumetric density than water. In FIG. 7C the apparatus is shown in cross section during the infusing part of the cycle, with liquid coffee flowing through the entire system. In FIG. 7D the apparatus is shown in cross section after completion of the infusion cycle, and as liquid coffee is being extracted from the coffee grounds and is returned into the carafe. And in FIG. 7E the apparatus is shown in cross section at the end of the process.

The operation of both embodiments of the cool infusion apparatus according to the invention are quite similar, so it may suffice to describe the user interaction with the apparatus in terms specific to the first embodiment.

The user lifts the carafe brings it to the faucet and fills it with tap water up to the marked level (approximately 2000 ml) and places the carafe on the base so its two valves connect with their mating valves in the base. Next the user removes the grounds container, fills it with approximately 300 gram of ground coffee, screws the lid back on, and places it on the base so its two valves connect with their mating valves in the base. Alternately the carafe and the ground container may stay in place and the user brings the water and the coffee grounds to the apparatus, for filling.

Next the user sets the control to the desired infusion time (preferably ranging from 5-15 minutes) pushes the "start" button (the center of the knob) which turns on the pump. The pump draws water from the carafe and dispenses the water into the coffee grounds container, through the valve located underneath the lower filter. The water fills the grounds container and floats the ground coffee up towards the upper filter at the top of the grounds container, thereby creating a uniform coffee grounds bed, ensuring that water flowing through is evenly spread throughout the bed of grounds to ensure even extraction from all the coffee grounds. As noted earlier dry ground coffee has a lower volumetric density than water, it floats in the water.

After the water permeates through the coffee grounds and is infused with the coffee oils present in the ground coffee it will pass through the upper filter and will rise to the top of the riser tube, from where it will flow down the riser tube, through the valve, and the tube connected to the valve under the carafe riser tube, up the carafe riser tube, and will drip down into the main carafe body, where it will be drawn out again by the pump, so the cycle continues, to extract more of the organic oils from the ground coffee as the infused liquid passes by and through the ground coffee porous structure. It has been learned through experiments that with a flow rate of 400 milliliter a minute it will take between 5-15 minutes of infusion in the apparatus according to the present invention to achieve a similar degree of extraction as would be in a static system described above where water and coffee are confined in a large container for 12-24 hours.

After the predetermined time, such as 5 to 15 minutes the pump is stopped. While an alternative embodiment allows for pausing circulation for a selectable period to allow the grounds to steep, in the preferred embodiment, return of all liquid to the liquid container commences at this point in time. In this case, after the pump is stopped, its direction is reversed, which draws all the remaining infused liquid out of the grounds container and returns it to the main body of the carafe. The achieve that, air is drawn through the openings at the top of the carafe riser tube, to maintain the grounds container at atmospheric pressure. When all the water was extracted, the pump continues to draw air over the grounds container to dry them up, for ease of disposing. It was determined that after approximately 1 minute of drying the coffee grounds they form a dry "cake" which is easily removed by opening the lid of the grounds container, lifting the filters by the top of the riser tube and lightly tapping it against the edge of a trash barrel or the side of the sink. It was found that typically, around an equal weight of liquid to that of the dry grounds remain in the ground coffee particles, as is the case in any coffee infusion process, be it hot or cool.

The carafe can now be removed from the base and the liquid coffee be poured into cups for immediate consumption. Or the carafe can be placed in the refrigerator for the coffee to be consumed later.

While any liquid pump can be used in the process it was determined that the most suitable pump is a peristaltic pump as the liquid coffee, which contains many oils remains confined to the tubes. If another type of pump where to be used, such as a centrifugal, an oscillating pump a membrane pump or a reciprocating pump there would be a good chance that the coffee oils would coat the surface of the pumps and cause them to jam after some use, especially if coffee oils are left in the pump for some time allowing the oils to gum up.

It was also determined that the tubes used to transport the liquid coffee can be kept clean if from time to time the apparatus is operated without coffee grounds, and an oil dissolving solution added to the water.

It should be understood that while the invention has been shown and described with reference to the specific exemplary embodiments shown, various changes in form and detail may be made without departing from the spirit and scope of the invention, and that the invention should therefore only be limited according to the following claims, including all equivalent interpretation to which they are entitled.

I claim:

1. A heatless cold-brewing infused beverage apparatus comprising:
    a first container having a liquid reservoir for initially retaining water and subsequently retaining and dispensing an infused beverage, a first container first opening for liquid passage proximate a bottom of the first container;
    a second container having an infusing reservoir for retaining an infusible material, a second container first opening for liquid passage proximate a bottom of the second container, a second container second opening proximate the bottom of the second container, and a riser tube within the infusing reservoir communicating with and extending upwardly from the second container second opening;
    a base adapted to engage the first and second containers and comprising:
        a pump;
        a first fluid pathway for providing liquid communication between the first container first opening for liquid passage, the pump, and the second container first opening for liquid passage;
        a second fluid pathway for providing liquid communication between the second container and the first container; and
        a control; wherein
    with the base engaging the first and second containers, the liquid reservoir retaining the water, and the infusing reservoir retaining the infusible material, the control is adapted to cause the pump to convey the water from the liquid reservoir through the first fluid pathway and into the infusing reservoir to flow though the infusible material wherein the water becomes the infused beverage, and to flow over and down the riser tube and through the second fluid pathway and into the liquid reservoir.

2. The apparatus of claim 1 wherein the base is adapted to engage the first and second containers, at least in part, through normally-closed valves disposed in the containers and valve actuators disposed in the base, and wherein the valve actuators are adapted to open the valves to enable fluid communication between the containers and the base, and the valves are adapted to seal the containers when the containers are disengaged from the base to prevent container leakage.

3. The apparatus of claim 2 wherein the control includes a timer, and is adapted to continue causing the pump to convey the infused beverage from the liquid reservoir through the first fluid pathway and into the infusing reservoir to flow through the infusible material and through the second fluid pathway and into the liquid reservoir continuously for a predetermined period of time.

4. The apparatus of claim 3 wherein the predetermined period of time is user selectable.

5. The apparatus of claim 2 wherein the control includes a timer, and is adapted to pause the pump after a predetermined period of time while the water is becoming the infused beverage.

6. The apparatus of claim 5 wherein the predetermined period of time is user selectable.

7. The apparatus of claim 1 wherein;
    the first container further has;
        a first container second opening for liquid passage proximate a bottom of the first container;
        a normally closed first container first valve at the first container first opening; and
        a normally closed first container second valve at the first container second opening;
    the second container further has;
        a normally closed second container first valve at the second container first opening; and
        a normally closed second container second valve at the second container second opening; and
    the base further has valve actuators adapted to open the first and second container first and second valves when the first and second containers are engaged by the base; and wherein
    the first fluid pathway provides liquid communication between the first container first valve, the pump, and the second container second valve;

the second fluid pathway provides liquid communication between the second container first valve, and the first container second valve; and with the base engaging the first and second containers so that the valve actuators open the first and second container first and second valves, the liquid reservoir retaining the water, and the infusing reservoir retaining the infusible material, the control is adapted to cause the pump to convey the water from the liquid reservoir through the first container first valve, the first fluid pathway, and the second container second valve and into the infusing reservoir to flow though the infusible material wherein the water becomes the infused beverage, and through the second container first valve, the second fluid pathway and the first container second valve and into the liquid reservoir.

8. The apparatus of claim 7 wherein the control includes a timer, and is adapted to continue causing the pump to convey the infused beverage from the liquid reservoir through the first container first valve, the first fluid pathway, and the second container second valve and into the infusing reservoir to combine with the infusible material and through the second container first valve, the second fluid pathway and the first container second valve and into the liquid reservoir continuously for a predetermined period of time.

9. The apparatus of claim 8 wherein the predetermined period of time is user selectable.

10. The apparatus of claim 7 wherein the control includes a timer, and is adapted to pause the pump after a predetermined period of time while the water is becoming the infused beverage.

11. The apparatus of claim 10 wherein the predetermined period of time is user selectable.

12. The apparatus of claim 1 wherein;
the first container further has a normally closed first container valve at the first container's container first opening,
the first container has a second opening which is a top opening;
the second container further has a normally closed second container valve at the second container first opening;
the second container second opening is a drain;
the base further comprises valve actuators adapted to open the first and second container valves when the first and second containers are engaged by the base; and
the first fluid pathway provides liquid communication between the first container valve, when the first container valve is opened, the pump, and the second container valve;
the second fluid pathway provides liquid communication between the drain and the top opening; and
the base is further adapted to engage the first and second container valves with the infusing reservoir disposed above the liquid reservoir and the drain disposed directly over the top opening; wherein
with the base engaging the first and second containers so the valve actuators open the first and second container valves, the liquid reservoir retaining the water, and the infusing reservoir retaining the infusible material, the pump is configured to then convey the water from the liquid reservoir through the first container valve, the first fluid pathway, and the second container valve and into the infusing reservoir to flow through the infusible material wherein the water becomes the infused beverage, and then from the drain and through the top opening and into the liquid reservoir; and to then draw air to dry the infusible material.

13. The apparatus of claim 12 wherein the control includes a timer, and is adapted to continue causing the pump to convey the infused beverage from the liquid reservoir through the first container valve, the first fluid pathway, and the second container valve and into the infusing reservoir to flow through the infusible material and then from the drain and through the top opening and into the liquid reservoir continuously for a predetermined period of time.

14. The apparatus of claim 13 wherein the predetermined period of time is user selectable.

15. The apparatus of claim 1 wherein the pump is a peristaltic pump.

16. A heatless cold-brewing infused beverage apparatus comprising:
a first container having;
a liquid reservoir for initially retaining water and subsequently retaining and dispensing an infused beverage; and
a first container opening for liquid passage proximate a bottom of the first container;
a second container having;
an infusing reservoir for retaining an infusible material;
a second container opening for liquid passage proximate a bottom of the second container;
and a riser tube within the infusing reservoir communicating with and extending upwardly from the second container opening;
a base adapted to engage the first and second containers and comprising:
a pump;
a first fluid pathway for providing liquid communication between the first container opening, the pump, and the second container opening;
a second fluid pathway for providing liquid communication between the second container and the first container; and
a control; wherein
with the base engaging the first and second containers, the liquid reservoir retaining the water, and the infusing reservoir retaining the infusible material, the control is adapted to cause the pump to convey the water from the liquid reservoir through the first fluid pathway and into the infusing reservoir to combine with the infusible material wherein the water becomes the infused beverage, and to flow over and down the riser tube and then from the second container opening through the second fluid pathway and the first container opening and into the liquid reservoir.

17. The apparatus of claim 16 wherein the base is adapted to engage the first and second containers, at least in part, through normally-closed valves disposed in the containers and valve actuators disposed in the base, and wherein the valve actuators are adapted to open the valves to enable fluid communication between the containers and the base, and the valves are adapted to seal the containers when the containers are disengaged from the base to prevent container leakage.

18. The apparatus of claim 17 wherein the control includes a timer, and is adapted to continue causing the pump to convey the infused beverage from the liquid reservoir through the first fluid pathway and into the infusing reservoir to flow through the infusible material and through the second fluid pathway and into the liquid reservoir continuously for a predetermined period of time.

19. The apparatus of claim 18 wherein the predetermined period of time is user selectable.

20. The apparatus of claim 17 wherein the control includes a timer, and is adapted to pause the pump after predetermined period of time while the water is becoming the infused beverage.

21. The apparatus of claim 20 wherein the predetermined period of time is user selectable.

22. The apparatus of claim 16 wherein the pump is a peristaltic pump.

23. A heatless cold-brewing infused beverage apparatus comprising:
- a first container having a liquid reservoir for initially retaining water and subsequently retaining and dispensing an infused beverage, a first container first opening for liquid passage proximate a bottom of the first container;
- a second container having an infusing reservoir for retaining an infusible material, a second container first opening for liquid passage proximate a bottom of the second container, a second container second opening proximate the bottom of the second container, and a riser tube within the infusing reservoir communicating with and extending upwardly from the second container second opening;
- a base adapted to engage the first and second containers and comprising:
  - a pump;
  - a fluid pathway for providing liquid communication between the first container first opening for liquid passage, the pump, and the second container first opening for liquid passage; and
  - a control; wherein with the base engaging the first and second containers, the liquid reservoir retaining the water, and the infusing reservoir retaining the infusible material, the control is adapted to cause the pump to convey the water from the liquid reservoir through the fluid pathway and into the infusing reservoir to flow though the infusible material wherein the water becomes the infused beverage; and to flow over and down the riser tube.

24. The apparatus of claim 23 wherein the base is adapted to engage the first and second containers, at least in part, through normally-closed valves disposed in the containers and valve actuators disposed in the base, and wherein the valve actuators are adapted to open the valves to enable fluid communication between the containers and the base, and the valves are adapted to seal the containers when the containers are disengaged from the base to prevent container leakage.

25. The apparatus of claim 24 wherein the control includes a timer and is adapted to continue causing the pump to convey the infused beverage from the liquid reservoir through the fluid pathway and into the infusing reservoir to flow through the infusible material continuously for a predetermined period of time.

26. The apparatus of claim 25 wherein the predetermined period of time is user selectable.

27. The apparatus of claim 24 wherein the control includes a timer, and is adapted to pause the pump after a predetermined period of time while the water is becoming the infused beverage.

28. The apparatus of claim 27 wherein the predetermined period of time is user selectable.

* * * * *